United States Patent [19]

Steenhorst

[11] 4,181,614
[45] Jan. 1, 1980

[54] SLUDGE REMOVAL APPARATUS

[75] Inventor: Johannes Steenhorst, Brussels, Belgium

[73] Assignee: The British Petroleum Company Limited, Sunbury-on-Thames, England

[21] Appl. No.: 927,025

[22] Filed: Jul. 24, 1978

Related U.S. Application Data

[63] Continuation of Ser. No. 803,809, Jun. 6, 1977, abandoned.

[30] Foreign Application Priority Data

Jun. 17, 1976 [GB] United Kingdom ............... 25110/76

[51] Int. Cl.² ........................ B01D 43/00; B03D 1/14; B03D 1/26
[52] U.S. Cl. ................................. 210/221 P; 209/168; 210/525; 261/77; 261/123; 261/124
[58] Field of Search ............... 134/22 R, 37; 210/44, 210/221 P, 525, 205, 220; 261/77, 123, 124; 209/164, 168, 170

[56] References Cited

U.S. PATENT DOCUMENTS

| | | | |
|---|---|---|---|
| 1,703,041 | 2/1929 | Imhoff | 210/221 P X |
| 3,224,170 | 12/1965 | Iwanaga et al. | 261/123 X |
| 3,338,415 | 8/1967 | Parks | 261/123 X |
| 3,396,102 | 8/1968 | Forrest | 210/525 X |
| 3,884,812 | 5/1975 | Lindquist | 210/220 |
| 3,890,231 | 6/1975 | Laclair et al. | 210/205 X |
| 3,984,323 | 10/1976 | Evens | 210/220 |

FOREIGN PATENT DOCUMENTS

| | | | |
|---|---|---|---|
| 2253919 | 5/1974 | Fed. Rep. of Germany | 261/123 |
| 227136 | 9/1943 | Switzerland | 210/221 P |
| 1152993 | 5/1969 | United Kingdom | . |

*Primary Examiner*—Marc L. Caroff
*Attorney, Agent, or Firm*—Morgan, Finnegan, Pine, Foley & Lee

[57] ABSTRACT

An apparatus for removing oily sludge from an installation bottom includes at least one gas sparge pipe, a collector in the form of a sloping inverted channel positioned above the sparge pipe so that sludge lifted by gas from the sparge pipe rises up into the collector, a riser pipe connected to the collector, and a gutter to which entrained sludge is fed by the collector via the riser pipe.

1 Claim, 3 Drawing Figures

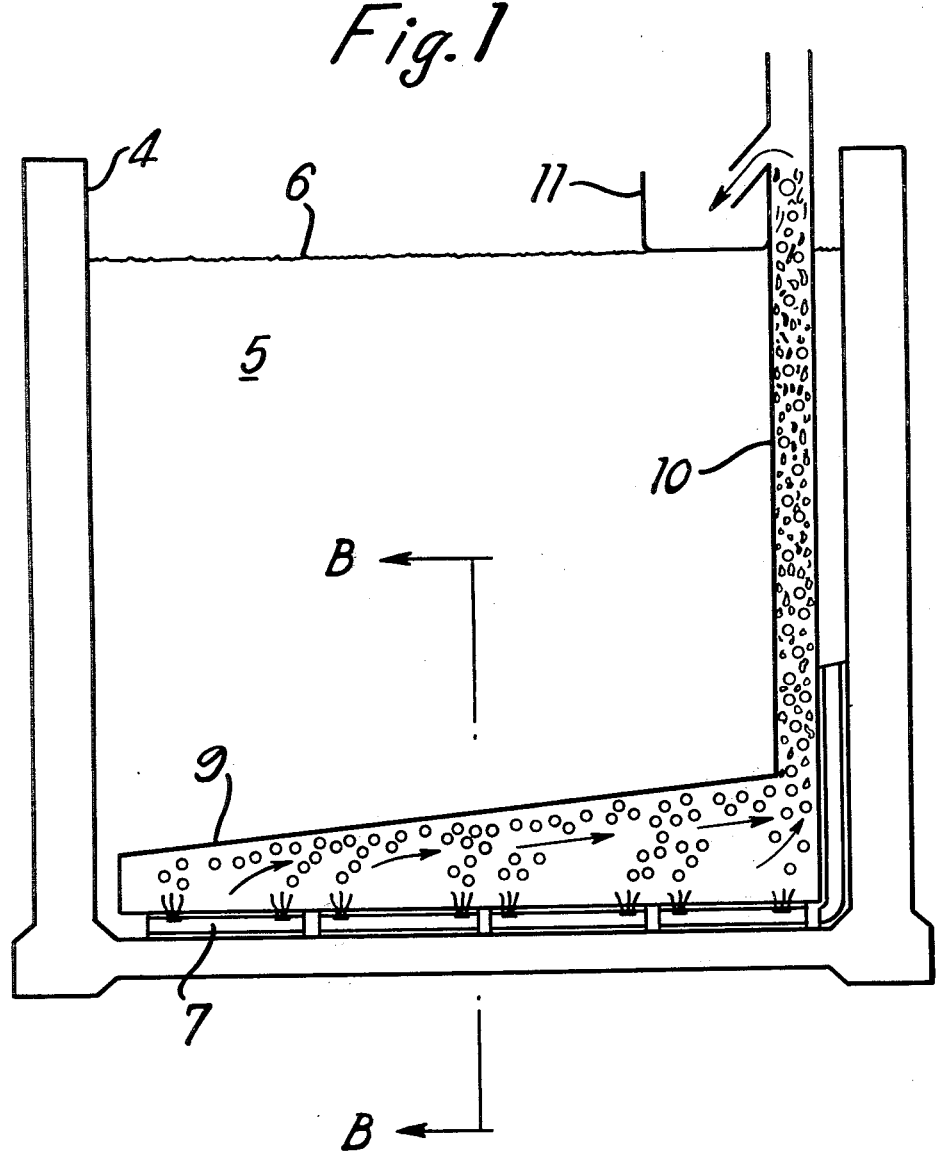

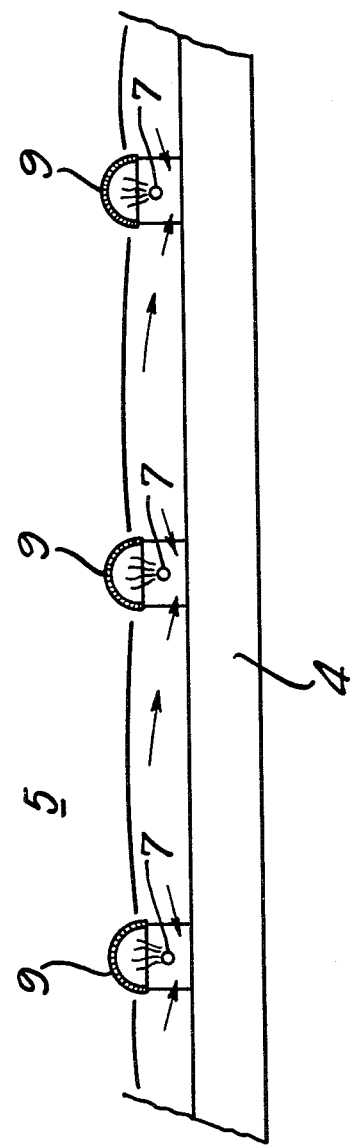

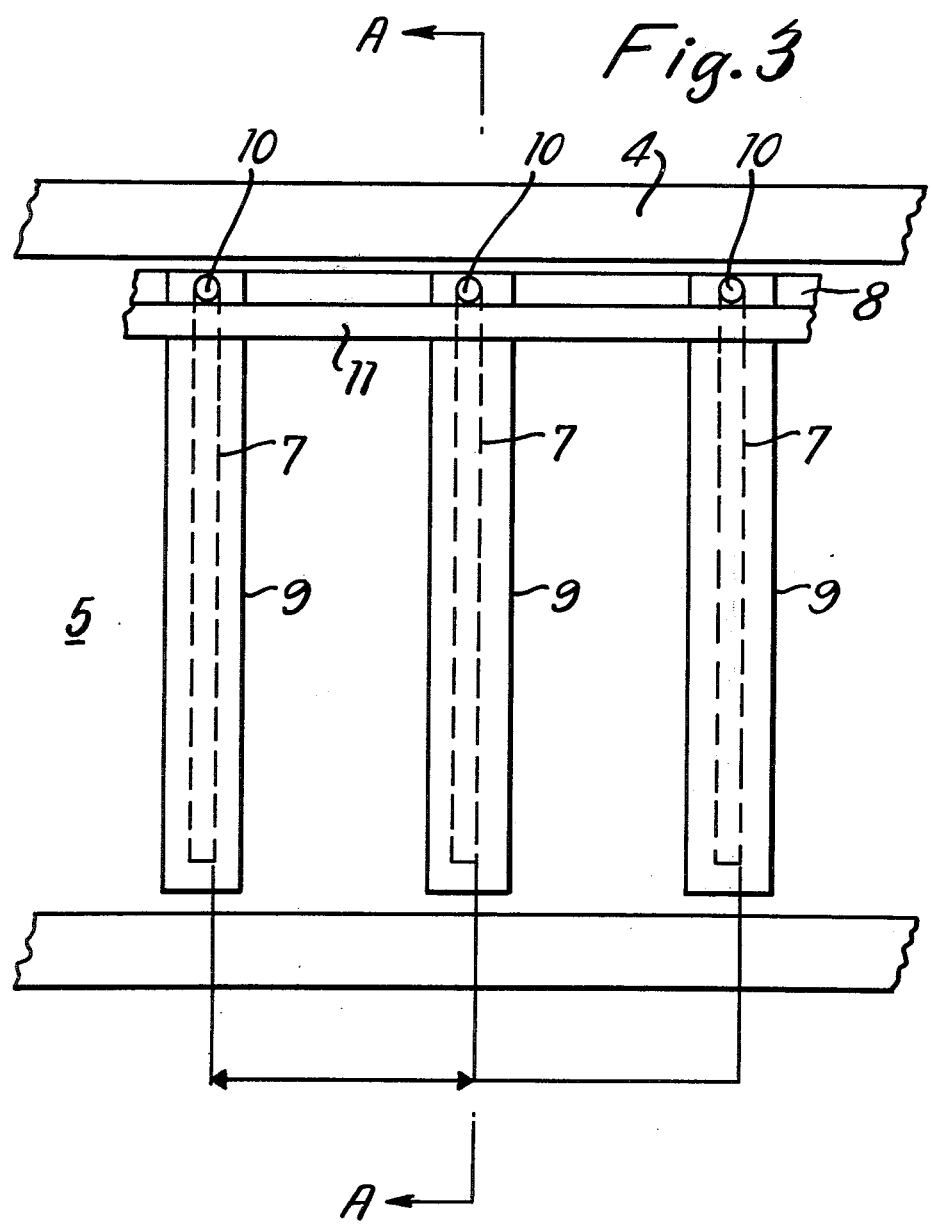

SLUDGE REMOVAL APPARATUS

This is a continuation, of application Ser. No. 803,809 filed June 6, 1977, now abandoned.

The present invention relates to a method and apparatus for the removal of sludges from tank bottoms, separators and ponds used in both waste water treatment facilities and raw water purification installations.

Chemical plants dealing with oily materials, and particularly oil refineries, accumulate a variety of oily sludges in the various tanks, separators and/or ponds through which or in which oily materials pass or are stored. These occur particularly in the treatment of crude oil and are to be found in crude tankage, desalters, API separators and surface drainage sumps and ditches. Sludge has to be removed from the bottoms from time to time and this has frequently required draining and manual removal. Mechanical devices such as scrapers or Archimedean screws have been suggested for the removal of the sludge but it is frequently found that such mechanical devices tend to fail from time to time due to mechanical failure caused by the harsh environment in which the mechanism has to operate.

Oil refineries may produce in excess of 1,000 tons of oily sludges annually and their disposal is becoming an increasingly serious problem. In the past oily sludges have been dumped on the land but increasing respect for the environment makes this practice undesirable. Thus processes are being developed for the removal of the oil from such sludges so that the oil can be recovered and the oil free solids that remain can be used as land fill material. To operate such processes economically it is desirable to provide a method for the regular or continuous removal of sludge from oil tanks so that the subsequent treatment of the sludge can be carried out in the most effective way.

An object of the present invention is to provide a method for the removal of sludge from an installation. A further object is to provide equipment that can be added to existing installations to provide a system whereby sludges, particularly oily sludges, may be removed therefrom.

According to one aspect of the present invention there is provided a method for the removal of sludge from an installation bottom which method comprises forcing a gas in the form of small bubbles through the sludge so that a sludge/gas mixture rises into a collector and passes to a riser pipe leading from the installation.

Any inert gas may be passed through the sludge and conveniently air may be used. In order to ensure that there are no areas on the installation bottom where undesirably large amounts of sludge may settle it is desirable to distribute the gas over substantially the whole of the bottom of the installation.

According to another aspect of the present invention there is provided apparatus for the removal of sludge from an installation bottom which apparatus comprises (a) one or more sparge pipes connectable or connected to a source of gas under pressure, (b) one or more collectors, one for each sparge pipe, positioned above each sparge pipe and having a sloping upper surface leading to a riser pipe, (c) one or more riser pipes fed by the collectors and (d) an outlet fed by the riser pipes.

Distribution of the gas over substantially the whole of the bottom of the installation is readily achieved by providing one or more sparge pipes which preferably take the form of straight line pipes having gas distribution holes running along their length. These pipes can then be connected to a suitable source of gas under pressure, e.g. a compressed air pump.

The gas having passed through the sludge rises through the liquid in the installation and is collected according to the present invention in a collector. Such collectors have sloping upper surfaces so that sludge settling to the bottom of the installation when falling upon the collector can slide down its upper surface and ultimately reach the installation bottom. The collector or collectors must be so arranged that substantially all the gas passing through the sludge rises up into the collector or collectors and does not pass up through the rest of the liquid in the installation. In this way the sludge lifted up by the gas is itself collected in the collector and not redistributed throughout the liquid in the installation.

The preferred means for distributing the gas and its associated collector comprises straight sparge pipes over which an inverted channel is placed as the collector. Thus in a rectangular tank a number of straight sparge pipes can be arranged to run across the base of the tank at intervals such that there is a limited sludge build up between the pipes when the system is in operation. These straight sparge pipes can easily be covered with inverted channel collectors, e.g. inverted gutters which can effectively collect all the gas passing from the sparge pipes.

The sparge pipes and collectors will usually be stationary, but if desired they can be modified to provide a sweeping action, e.g. a to and fro movement across a rectangular installation, or a rotary movement around a central riser pipe in a circular installation.

In a further modification, they may be suspended from either a fixed or floating assembly and lowered to contact and remove sludge.

The preferred horizontal distance between sparge pipes in a rectangular stationary installation is between 50 and 300 cms.

The preferred vertical distance between a sparge pipe and its associated collector is between 10 and 30 cms.

The gas carrying the sludge rises through the liquid in the installation and is collected within the collector. In order that it may pass to a riser pipe and not escape from the collector it is necessary to ensure that there is an upwardly sloping path within the collector up which the gas can flow. Thus where the collector is an inverted channel it is necessary to ensure that this channel is mounted at an angle from the horizontal and that the riser pipe is connected to it at its upper end.

The riser pipe is of sufficient diameter to ensure that all gas entrained sludge that is collected in the collector can pass upwards at a sufficient rate to prevent escape of gas to the surface of the liquid in the installation. The riser pipe is led from the installation and thus the sludge entrained by the gas is removed from the installation. Because of reduced specific gravity the rising gas/sludge mixture is capable of rising above the surface of the liquid in the installatin and thus if the level of liquid is near the top of a side where a riser rises, it is possible to arrange that the riser pipe bends over the side wall and thus the gas sludge mixture is removed from the installation without need to provide exit pipes in the walls or additional pumping facilities.

It is a further advantageous feature of the present invention that, when the sludge is oily, in addition to removing oily sludge from the bottom of an installation, the gas bubbles also entrain a proportion of the oil associated with the sludge and detach it from the sludge from which it can be recovered separately. This in effect amounts to a simultaneous pretreatment of the sludge for oil removal and leaves less oil associated with the sludge for subsequent removal.

The present invention is illustrated in the drawings accompanying the provisional specification wherein FIG. 1 is a vertical cross sectional and elevation of an API separator, FIG. II is a partial section on BB of FIG. I and FIG. III is a partial plan view.

In the drawings the API separator 4 contains liquid 5 having a surface 6. In the bottom of the tank a number of sparge pipes 7 are arranged parallel to each other on the bottom of the tank. These are connected to a manifold pipe 8 through which compressed air can be blown. Above each sparge pipe is an inverted gutter 9. These are mounted directly above each sparge pipe and are inclined slightly to the horizontal so that they can be connected at their upper ends to riser pipes 10. These riser pipes discharge into a gutter 11.

In operation when sludge collects on the bottom of the tank, air is passed through the sparge pipes, escaping from outlets spaced along the pipe. The escaping air entrains sludge from the bottom of the tank and an air/sludge mixture rises to the collecting gutters and flows to their upper ends and then escapes from the tank through the riser pipes 10. The entrained sludge/air mixture discharged into the gutter 11 flows from the tank for treatment.

I claim:

1. Apparatus for the removal of sludge from an installation containing a liquid and having sludge at the bottom, which apparatus comprises (a) at least one sparge pipe having gas distribution holes connected to a means for supplying gas under pressure, (b) at least one inverted channel means corresponding to the number of sparge pipes and positioned above each sparge pipe and having a sloping upper surface leading to a riser pipe, the inverted channel means extending wholly over all of the gas distribution holes of said sparge pipe so that substantially all the gas passing through the sludge rises up into the inverted channel means and does not pass up through the rest of the liquid in the installation, (c) at least one riser pipe connected to said inverted channel means, and (d) a gutter means fed by the riser pipes.

* * * * *